US007532859B2

(12) United States Patent
Videtich

(10) Patent No.: US 7,532,859 B2
(45) Date of Patent: May 12, 2009

(54) TARGETED MESSAGING FOR MOBILE VEHICLES USING SATELLITE-RADIO BROADCASTS

(75) Inventor: Matt C. Videtich, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 333 days.

(21) Appl. No.: 10/930,023

(22) Filed: Aug. 30, 2004

(65) Prior Publication Data

US 2006/0046649 A1    Mar. 2, 2006

(51) Int. Cl.
*H04B 7/185* (2006.01)
*G01M 17/00* (2006.01)

(52) U.S. Cl. .................. 455/12.1; 370/316; 701/29

(58) Field of Classification Search ............. 370/316; 455/12.1, 3.02, 3.03, 3.04; 701/29, 30, 31, 701/32; 710/29, 30, 31, 32
See application file for complete search history.

(56) References Cited

U.S. PATENT DOCUMENTS

| 6,084,870 | A  | * | 7/2000 | Wooten et al. ............... 370/349 |
| 6,370,454 | B1 |   | 4/2002 | Moore ......................... 701/29 |
| 6,686,880 | B1 | * | 2/2004 | Marko et al. ................. 342/457 |
| 6,992,991 | B2 | * | 1/2006 | Duske et al. ................. 370/316 |
| 2005/0251455 | A1 | * | 11/2005 | Boesen ........................ 705/26 |

OTHER PUBLICATIONS

U.S. Appl. No. 10/867,401, filed Jun. 14, 2004, "Automobile Recall Notification System and Method for Using the Same," assigned to General Motors Corporation.

* cited by examiner

*Primary Examiner*—Nick Corsaro
*Assistant Examiner*—Shannon R Brooks

(57) ABSTRACT

A targeted message is sent to a mobile vehicle using a satellite broadcast system. A satellite broadcast message including a vehicle identification tag and the targeted message is received at the mobile vehicle. A determination is made on whether to play the targeted message at the mobile vehicle based on the vehicle identification tag, and the targeted message is played based on the determination. A system for sending a targeted message to a mobile vehicle and related computer programming code are also disclosed.

13 Claims, 4 Drawing Sheets

TARGETED MESSAGING FOR MOBILE VEHICLES USING SATELLITE-RADIO BROADCASTS

FIELD OF THE INVENTION

This invention relates generally to data transmissions over a wireless communication system. More specifically, the invention relates to a method and system for sending targeted messages to a mobile vehicle using a satellite-radio broadcast system.

BACKGROUND OF THE INVENTION

Satellite radio is another broadcast service available to automobiles and other mobile vehicles, joining the longstanding and well-established amplitude modulation (AM) radio, frequency modulation (FM) radio, and television broadcasts. Over 40% of radio listening in the United States takes place in mobile vehicles, the most popular location for receiving radio broadcasts.

A satellite radio service provider uses one or more satellites to broadcast content for each of its channels, and often has terrestrial repeaters to improve broadcast coverage in areas of satellite signal blockage. A satellite signal can contain hundreds of channels, the number depending on bandwidth and channel compression, and encoding parameters. Many of these broadcasts may be delivered with additional data such as station identification, song titles, and program schedules.

Satellite radio digital radio services may be offered at an automobile dealership to an owner of a vehicle having a factory-installed satellite radio, or through traditional marketing services such as bulk mailing, radio or television advertising, and telemarketing. Re-marketing attempts to obtain customers who were either not made aware of their options or declined to accept satellite radio service are often handled through similar marketing approaches. In addition, satellite radio broadcasters and automobile manufacturers are unable currently to target advertising or service announcements to specific groups of people via the broadcast medium.

Accordingly, it would be desirable to have a system and method for sending introductory satellite radio offers, automobile service announcements, and other types of marketing messages that are targeted to a specific owner or a group of owners of vehicles equipped with a satellite radio, and to solicit responses to the targeted messages. It is an object of this invention, therefore, to provide a method for sending targeted messages to mobile vehicles, and to overcome the deficiencies and obstacles described above.

SUMMARY OF THE INVENTION

One aspect of the invention is a method of sending a targeted message to a mobile vehicle. A satellite broadcast message including a vehicle identification tag and the targeted message is received at the mobile vehicle. A determination is made on whether to play the targeted message at the mobile vehicle based on the vehicle identification tag. The targeted message is played based on the determination.

Another aspect of the invention is a system for sending a targeted message to a mobile vehicle. The system includes means for receiving a satellite broadcast message including a vehicle identification tag and the targeted message at the mobile vehicle, means for determining whether to play the targeted message at the mobile vehicle based on the vehicle identification tag, and means for playing the targeted message based on the determination.

Another aspect of the invention is a computer usable medium including a program to send a targeted message to a mobile vehicle. The program includes computer program code to receive a satellite broadcast message having a vehicle identification tag and the targeted message at the mobile vehicle, computer program code to determine whether to play the targeted message at the mobile vehicle based on the vehicle identification tag, and computer program code to play the targeted message based on the determination.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
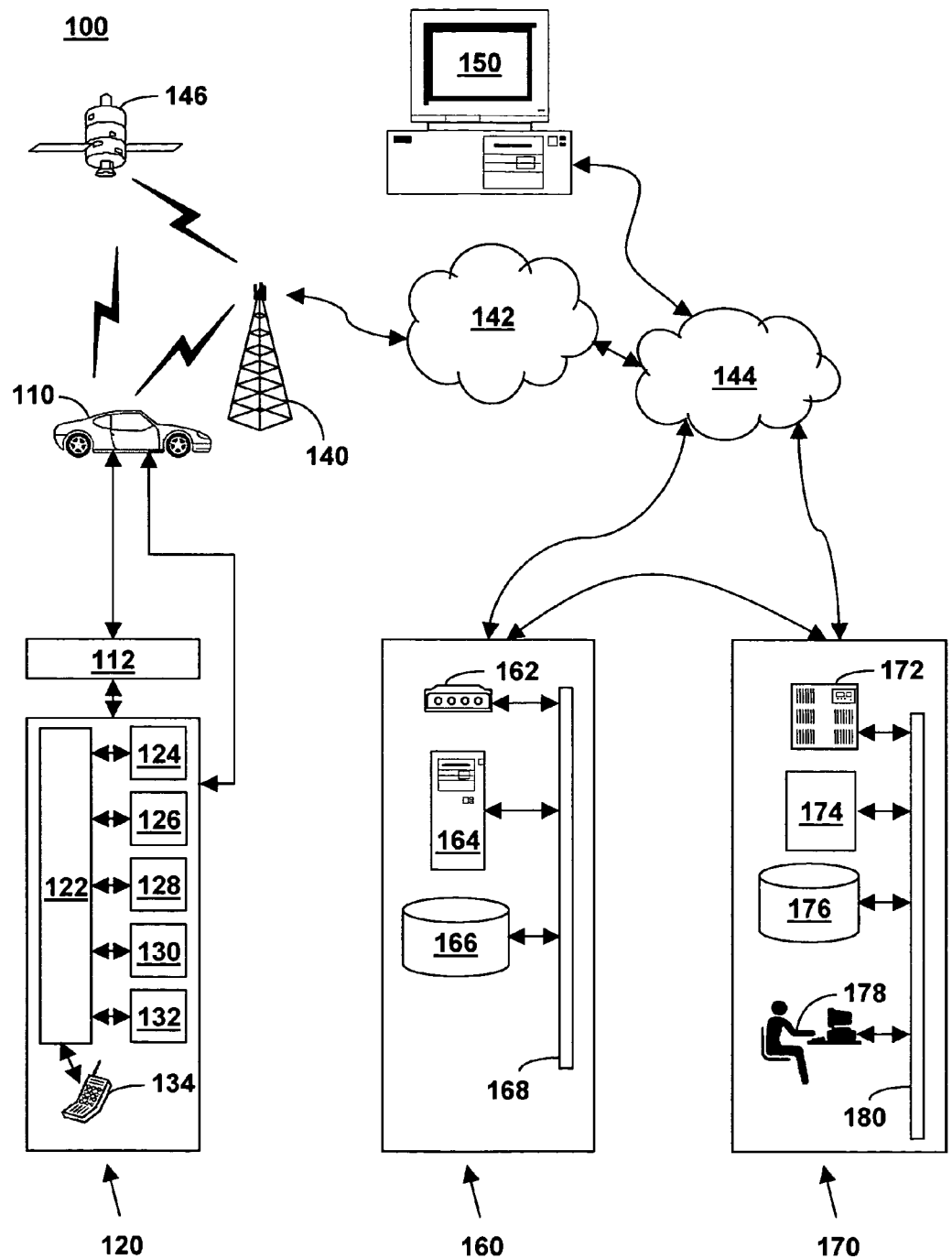
FIG. 1 illustrates a system for sending a targeted message to a mobile vehicle using a satellite-radio broadcast system, in accordance with one embodiment of the current invention.

FIG. 1 illustrates one embodiment of a mobile vehicle communication system (MVCS) 100 for controlling vehicle modules. MVCS 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controllerarea network, International Organization for Standardization (ISO) Standard 9141, ISO Standard 11898 for high-speed applications, ISO Standard 11519 for lower speed applications, and Society of Automotive Engineers Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In another embodiment, processor 122 is implemented as an application-specific integrated circuit. In another embodiment, processor 122 is implemented as a processor working in conjunction with a central processing unit performing the function of a general-purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate programming modes and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signals over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In one example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service (SDARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to computer 150, web-hosting portal 160, and call center 170. In one embodiment, land network 144 is a public-switched telephone network. In another embodiment, land network 144 is implemented as an Internet protocol (IP) network. In other embodiments, land network 144 is implemented as a wired network, an optical network, a fiber network, a wireless network, or a combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol, or transport-control protocol and Internet protocol. In one embodiment, the data includes directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from data modem 162, data that is then transferred to web server 164. Data modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one example, the call center is a telematics call center, facilitating communications to and from telematics unit 120 in MVCU 110. In another example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

In accordance with one embodiment of the present invention, MVCS 100 serves as a system for sending a targeted message to a mobile vehicle using a satellite-radio broadcast system. A satellite broadcast message including a vehicle identification tag and the targeted message are sent from satellite broadcast system 146 to MVCU 110. As part of satellite broadcast system 146, a satellite radio uplink facility (not shown) sends and receives radio signals to a geostationary satellite. The satellite radio uplink facility may uplink information necessary for sending targeted messages from call center 170 to MCVU 110 via satellite broadcast system 146 through, for example, a portion of the bandwidth designated for sending command signals and messages to mobile vehicles.

MVCU 110 includes a receiver for receiving the satellite broadcast message with the vehicle identification tag and the targeted message. The satellite radio receiver (not shown) receives digital satellite-radio broadcast signals from, for example, a terrestrial radio transmitter or a satellite radio service geostationary satellite. The satellite radio receiver may receive broadcast radio information over one or more channels and generate an audio output or provide data communications from the satellite service provider. In addition to music and entertainment, traffic information, road construction information, advertisements, news and information on local events, satellite broadcast system 146 may send targeted messages to the satellite radio receiver and related information such as toll-free numbers to respond to the targeted messages. Satellite radio broadcast signals received by the satellite radio receiver are monitored for signals with targeted information, and when the targeted information is detected, the targeted message and associated information may be extracted from the broadcast channel.

The satellite radio receiver may be physically separated from telematics unit 120 though electronically connected to the unit with a cable or over the vehicle communication network 112, or may be embedded within telematics unit 120. Telematics unit 120 may monitor, filter, and send signals that are received from satellite broadcasts, radio broadcasts, or other wireless communication systems to output devices such as speaker 132 and visual display devices (not shown).

Processor 122 makes a determination whether to play the targeted message based on the vehicle identification tag. Speakers 132, a visual display such as a liquid-crystal display (LCD), or other in-vehicle audio or visual device may be used to play the targeted message based on the determination. For example, a message including a toll-free number may be played or displayed to an occupant in the mobile vehicle.

A play-delay indicator may be included with the satellite broadcast message to allow storage of the targeted message in memory at the mobile vehicle in response to the play-delay indicator. The play-delay indicator, when set, allows the message to be stored to allow an occupant in the mobile vehicle to hear or see the targeted message when prompted by the occupant using, for example, a button on a radio, entertainment console, or telematics unit 120.

To establish a particular group or class of mobile vehicles for targeted messaging via satellite radio broadcasting, one or more customer data records stored in communication services database 176 at call center 170 may be filtered to determine a target group of mobile vehicles. After a target group of mobile vehicles is determined, a vehicle identification tag including, for example, a set or string of one or more vehicle identification numbers associated with the target group of mobile vehicles is compiled and sent with the targeted message to a satellite radio broadcaster for transmitting the satellite broadcast message to one or more targeted mobile vehicles from satellite broadcast system 146.

Computer program code containing suitable instructions to send the targeted message to the mobile vehicle may reside in part at call center 170, satellite broadcast system 146, MVCU 110, or telematics unit 120. For example, a program including computer program code to receive the satellite broadcast message with the vehicle identification tag and the targeted message, to determine whether to play the targeted message, and to play the targeted message may reside within processor 122 or within in-vehicle memory 128 so that processor 122 may execute the program instructions accordingly. The program may include code to receive a play-delay indicator and to store the targeted message at the mobile vehicle in response to the play-delay indicator.

A program residing within call center 170 may include computer program code to determine a target group of mobile vehicles, to determine a vehicle identification tag associated with the target group, and to send the vehicle identification tag and the targeted message from the call center to a satellite radio broadcaster for transmitting the satellite broadcast message to one or more vehicles in the target group. For example, one or more customer data records stored in communication services database 176 at call center 170 may be filtered electronically to determine the target group of mobile vehicles.

Code to send the satellite broadcast message including the vehicle identification tag and the targeted message may reside within satellite broadcast system 146 in accordance with communication protocols of the satellite-radio broadcaster.

Figure 2:
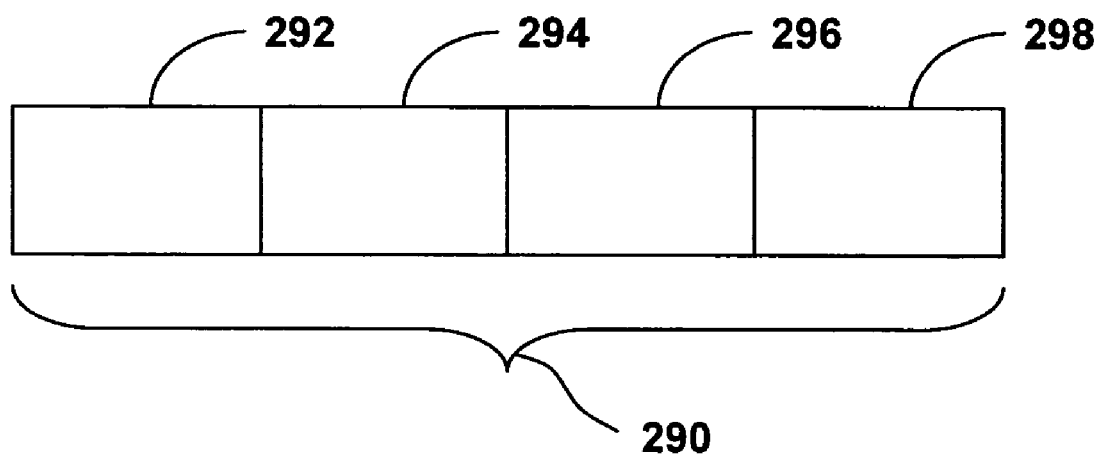
FIG. 2 illustrates a satellite broadcast message including a targeted message, in accordance with one embodiment of the current invention.

FIG. 2 illustrates a satellite broadcast message including a targeted message, in accordance with one embodiment of the present invention. Satellite broadcast message 290 includes a vehicle identification tag 292 and a targeted message 298. Satellite broadcast message 290 may include one or more information fields such as vehicle identification tag 292, a message identifier field 294, a message action field 296, and targeted message 298. Satellite broadcast message 290 may be constructed and sent, for example, from call center 170 of FIG. 1 to a satellite radio broadcaster and transmitted to one or more intended vehicle recipients through satellite broadcast system 146 of FIG. 1.

Vehicle identification tag 292 includes one or more identification numbers associated with one or more mobile vehicles in a target group of mobile vehicles. In one example, vehicle identification tag 292 includes a seventeen-digit alphanumeric code of the vehicle identification number (VIN). In another example, vehicle identification tag 292 includes one or more characters associated with the VIN that indicate a particular manufacturer, model, make, or country of manufacture. In another example, vehicle identification tag 292 includes a vehicle identifier of the mobile vehicle such as the VIN, an electronic serial number of a telematics unit within the mobile vehicle, a cell phone number of a telematics unit within the mobile vehicle, a satellite radio receiver identification number associated with the satellite radio receiver in the mobile vehicle, or a pre-assigned vehicle reference number stored within the mobile vehicle. Frequent messages sent to a specific vehicle or group of vehicles may be received and played, for example, by first sending and storing the pre-assigned vehicle reference number within the mobile vehicle so that targeted message 298 is played or prompted to be played whenever satellite broadcast message 290 with the pre-assigned vehicle reference number is received.

Message identifier field 294 includes, for example, a message identification number associated with targeted message 298. The message identification number may be correlated, for example, to the time sequence in which targeted message 298 is first sent and may indicate other functions or message information such as a group or personal message.

Message action field 296 includes, for example, how the targeted message is to be presented to the user or occupant of the mobile vehicle, such as on a display, over a speaker, or through an in-vehicle audio or visual output device. For example, targeted messages can be played through the in-vehicle audio speakers, on a heads-up display, or on an in-vehicle display such as a video feed or screen image. Message action field 296 may contain a message response command that allows telematics unit 120 of FIG. 1 to dial a predetermined number from in-vehicle telematics unit 120 to call center 170 in response to a user input. Message action field 296 may include a play-delay indicator directing telematics unit 120 to store targeted message 298 until prompted or otherwise directed to play targeted message 298. An indicator light, predetermined tone or tone sequence, or short message may be displayed or played within the vehicle to indicate that a message is stored and waiting to be delivered. For example, a radio head is able to display blinking or scanned characters to indicate that a targeted message is available for playing.

Targeted message 298 includes, for example, service information, an advertisement, a recall notification, or a vehicle alert message. Targeted message 298 may be played, for example, using an audio output device, a visual output device, or other message delivery system in the mobile vehicle. Targeted message 298 may be played in response to a user input, such as with a depression of a button on a radio or telematics unit, or an appropriate voice command. A phone number may be included within targeted message 298 to allow manual or automatic connection to an operator or recorded message options in response to targeted message 298.

In one example, satellite broadcast message 290 includes a message response command within message action field 296 to dial a predetermined number from in-vehicle telematics unit 120 to call center 170 in response to a user input. In another example, a play-delay indicator is included within message action field 296 of satellite broadcast message 290 instructing telematics unit 120 to store targeted message 298, which allows for a delayed playing of targeted message 298 at an appropriate or convenient time for a vehicle occupant.

Figure 3:
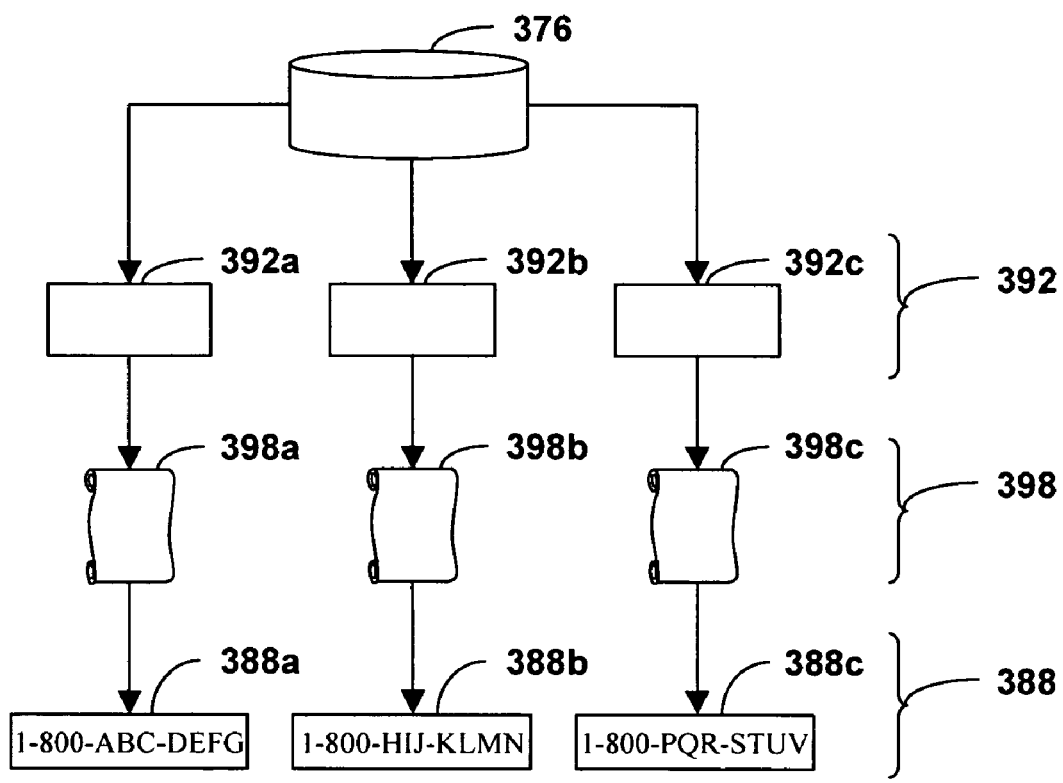
FIG. 3 illustrates a method of sending a targeted message to a mobile vehicle, in accordance with one embodiment of the current invention.

FIG. 3 illustrates a method of sending a targeted message to a mobile vehicle, in accordance with one embodiment of the present invention. The method allows for the introduction of satellite radio offers, automobile service announcements, and other types of marketing that are targeted to a specific owner or a group of owners of vehicles equipped with a satellite radio, based on parameters such as vehicle type, vehicle model, geographic region, point-of-sale dealership, garage location, or additional factory-installed equipment on the vehicle. This type of personalization allows specific call-in numbers and messages to be sent to targeted vehicles.

To send a targeted message, one or more customer data records in a database 376, which are located, for example, at call center 170 of FIG. 1, are filtered to create lists of targeted groups of mobile vehicles that are intended to receive a targeted message 398. Targeted message 398 can be designated for a specific group of mobile vehicles by using a vehicle identification tag 392. Vehicle identification tags 392 and targeted messages 398 are sent via a satellite broadcast message to the mobile vehicles. Targeted message 398 may be played when received or locally stored for later playback when convenient for an in-vehicle occupant. The satellite broadcast message may include a message response command to dial a predetermined telephone number 388, from in-vehicle telematics unit 120 to call center 170 as illustrated in FIG. 1, or to another prescribed location in response to a user input.

The target groups of mobile vehicles may include, for example, a list of all 2003 model Chevrolets that are not subscribed currently to a satellite radio service. The vehicle identification numbers or other vehicle-specific numbers are compiled into a vehicle identification tag 392a. A targeted message 398a may include incentives to activate the satellite radio service, and may display a toll-free number 388a that, in response to a user input, connects the recipient of targeted message 398a to a predetermined group of operators or representatives within call center 170 of FIG. 1 or to another suitable site. Exemplary user inputs include a verbal command to dial a displayed telephone number, or the depression of a button that initiates a telephone call.

In another example, customer data records in database 376 are searched to determine all vehicles that were sold at a particular dealership, have an on-board telematics unit 120 as illustrated in FIG. 1, and have a satellite radio receiver that is able to receive satellite radio broadcasts. The results of the database search are compiled into a vehicle identification tag 392b, and then vehicle identification tag 392b is combined with a targeted message 398b to send to the targeted group of mobile vehicles a special offer for vehicle services such as an oil change or vehicle inspection. A toll-free number 388b may be displayed within the vehicle, and with the consent of the vehicle occupant, a call may be originated from telematics unit 120 to the displayed or stored number.

In another example, customer data records in database 376 are searched to determine all trucks excluding extended-cab trucks that are equipped with satellite radios and were built in the United States within a predetermined time period. A vehicle identification tag 392c is generated based on the customer data records and combined with a targeted message 398c to alert owners of a recall notification regarding their particular vehicle. A toll-free number 388c may be displayed that can be called to receive more details regarding the recall notification or other vehicle alert. Other services and messages may be delivered in a similar manner.

Figure 4:
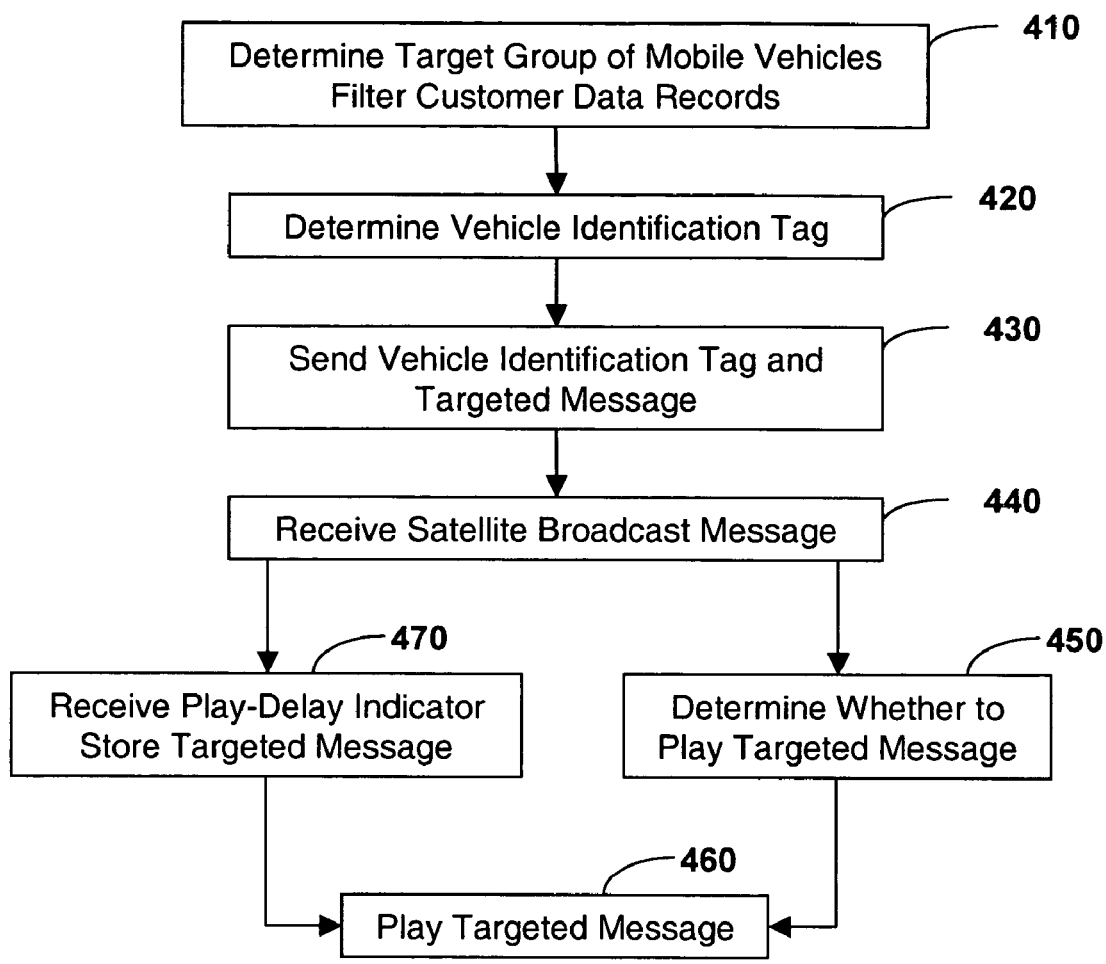
FIG. 4 illustrates a method of sending a targeted message to a mobile vehicle, in accordance with another embodiment of the current invention.

FIG. 4 illustrates a method of sending a targeted message to a mobile vehicle, in accordance with another embodiment of the current invention.

A target group of mobile vehicles is determined, as seen at block 410. The target group of mobile vehicles may be determined, for example, at a call center where customer data records are retained and where calls can be sent to or received from one or more mobile vehicles. One or more customer data records may be filtered to determine the target group of mobile vehicles based on, for example, vehicle model, vehicle manufacturer, location of manufacture, year of manufacture, vehicle options, a subscription status, or one or more subscriber preferences. In one example, a filtering algorithm extracts all customer data records corresponding to vehicles with currently inactive satellite radio subscriptions, then groups them by vehicle type, vehicle model, point of sale, street address of the owner, or other suitable parameter. In another example, an algorithm selects only a portion of a target group of mobile vehicles for delivery of a targeted message so that the call center can control the rate and volume of returned calls. Appropriate call-in numbers and targeted sales messages or other applicable messages may be attached to each group.

A vehicle identification tag is determined, as seen at block 420. The vehicle identification tags may be determined for the determined target group of mobile vehicles and may include, for example, a list of vehicle identification numbers or other identification numbers associated with one or more mobile vehicles in the target group.

Once all the information is gathered, the vehicle identification tag, the targeted message, an optional call-in number, and any other user information necessary for sending and receiving the targeted message is sent to an uplink facility of a satellite radio service provider. The information may be sent from the call center to the satellite radio uplink facility via conventional landline or wireless links. The information may include, for example, a request for the telematics unit of the vehicle to call the call center at the request of a user and in response to the delivered targeted message.

The vehicle tag and the targeted message are sent, as seen at block 430. The determined vehicle identification tags and the targeted message are sent, for example, from the call center to a satellite radio broadcaster such as a satellite radio service uplink facility to transmit the satellite broadcast message to the mobile vehicle. The satellite broadcast message may include one or more information fields such as a vehicle identification tag, a message identifier field, a message action field, or a targeted message. The targeted message may include, for example, service information, an advertisement, a recall notification, or a vehicle alert message.

In an exemplary embodiment of the present invention, the satellite radio uplink facility uplinks the vehicle identification tag, the targeted message, and other related information to a geostationary satellite or terrestrial radio transmitter of the satellite radio service provider. A computer application at the satellite radio uplink facility may control the sending of signals and data that are received from the call center by using a predetermined broadcast channel. The signals may be transmitted, for example, over a spectrum allocated for nationwide broadcasting of satellite-based Digital Audio Radio Service. The satellite radio uplink facility may uplink command information to a terrestrial radio transmitter for local or metropolitan broadcasts. Alternatively, satellite radio terrestrial radio transmitters may receive radio signals from a geostationary satellite, amplify the signals, and rebroadcast the signals. Satellite broadcast messages may be transmitted once, periodically, or in another predefined sequence of time.

The satellite broadcast message is received, as seen at block 440. A computer application running in the telematics unit of a mobile vehicle may monitor one or more satellite-radio-system broadcast channels for a satellite broadcast message that includes the vehicle identification tag and the targeted message. The satellite broadcast message is received, for example, with an in-vehicle satellite radio receiver from one or more satellite radio service geostationary satellites, a satellite radio broadcast satellite, or a terrestrial radio transmitter that amplifies and repeats signals received from a satellite radio broadcast satellite. The broadcast channel may be monitored for particular command strings or protocol, and the targeted message may be extracted for further processing when a particular vehicle identifier is ascertained.

A determination is made on whether to play the targeted message, as seen at block 450. The determination of whether to play the targeted message at the mobile vehicle is based, at least in part, on the vehicle identification tag. The determination of whether to play the targeted message may include comparing the received vehicle identification tag with a vehicle identifier of the mobile vehicle. Examples of the vehicle identifier of the mobile vehicle include a vehicle identification number, an electronic serial number of a telematics unit within the mobile vehicle, a cell phone number of a telematics unit within the mobile vehicle, a satellite radio receiver identification number associated with the satellite radio receiver in the mobile vehicle, or a pre-assigned vehicle reference number stored within the mobile vehicle. For example, when a targeted message addressed to the host vehicle is found, specific sales messages and telephone numbers are extracted from the payload and stored in memory for action at a predetermined time, such as the next ignition cycle, immediately, once every twenty ignition cycles, or upon an input from a vehicle occupant. A portion of the message or an indicator may be displayed or otherwise conveyed to occupants within the mobile vehicle to indicate that a message is waiting.

The targeted message is played based on the determination, as seen at block 460. The targeted message may be played, for example, using an audio output device, a visual output device, or other message delivery system in the mobile vehicle when received. Alternatively, the targeted message may be locally stored in memory and played, for example, in response to a user input such as a verbal command, or activated by depressing a button on an in-vehicle radio, entertainment console, in-vehicle communications device, or in-vehicle telematics unit.

In one embodiment, the telematics unit calls a telematics service call center after receiving the targeted message. The satellite broadcast message may include a message response command to dial a predetermined number from an in-vehicle telematics unit to a call center in response to a user input. A mobile phone in the vehicle places a wireless call with the help of the telematics unit to a wireless service provider or a call center in response to the targeted message. For example, when the user provides a response to a prompt, a predetermined phone number associated with the targeted number is dialed and connected accordingly to receive a sales pitch, to activate or enroll in a service, to hear vehicle-related information, or to perform a desired function.

Alternatively, a play-delay indicator may be received, as seen at block 470. The targeted message is stored when the play-delay indicator is received with the satellite broadcast message. The targeted message is stored at the mobile vehicle for later playback and a prompt is provided to the user. At the convenience of the user and in response to a user input, the targeted message is activated and played, as seen at block 460.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of sending a targeted message to a mobile vehicle, the method comprising:
    receiving a satellite broadcast message at the mobile vehicle, the satellite broadcast message including a vehicle identification tag, a play-delay indicator associated with a delay time expressed as a predetermined number of ignition cycles of the mobile vehicle, and the targeted message;
    determining whether the vehicle identification tag of the satellite broadcast message matches a vehicle identification tag associated with the mobile vehicle; and
    if the vehicle identification tag of the satellite broadcast message matches the vehicle identification tag associated with the mobile vehicle, storing the targeted message at the mobile vehicle responsive to the play-delay indicator and playing the targeted message using one of an audio output device and a visual output device after expiration of the predetermined number of ignition cycles associated with the play-delay indicator.

2. The method of claim 1, wherein the vehicle identifier of the mobile vehicle is selected from the group comprising a vehicle identification number, an electronic serial number of a telematics unit within the mobile vehicle, a cell phone number of a telematics unit within the mobile vehicle, a satellite radio receiver identification number, and a pre-assigned vehicle reference number stored within the mobile vehicle.

3. The method of claim 1, wherein the vehicle identification tag comprises at least one identification number associated with one or more mobile vehicles.

4. The method of claim 1, wherein the received broadcast message further comprises a message identifier field.

5. The method of claim 1, wherein the vehicle targeted message further comprises a message selected from the group consisting of service information, an advertisement, a recall notification, and a vehicle alert message.

6. The method of claim 1 further comprising:
determining a target group of mobile vehicles at a call center;
determining the vehicle identification tag for the determined target group of mobile vehicles; and
sending the determined vehicle identification tag and the targeted message from the call center to a satellite radio broadcaster for transmitting the satellite broadcast message to the mobile vehicle.

7. The method of claim 6 further comprising:
filtering at least one customer data record at the call center to determine the target group of mobile vehicles.

8. A system for sending a targeted message to a mobile vehicle, the system comprising:
means for receiving a satellite broadcast message at the mobile vehicle, the satellite broadcast message including a vehicle identification tag, a play-delay indicator associated with a delay time expressed as a predetermined number of ignition cycles of the mobile vehicle, and the targeted message;
means for determining whether the vehicle identification tag associated with the satellite broadcast message matches a vehicle identification tag associated with the mobile vehicle; and
means for storing the targeted message at the mobile vehicle responsive to the play-delay indicator and playing the targeted message using one of an audio output device and a visual output device after expiration of the predetermined number of ignition cycles associated with the play-delay indicator if the vehicle identification tag matches a vehicle identification tag associated with the mobile vehicle.

9. The system of claim 8 further comprising:
means for determining a target group of mobile vehicles at a call center;
means for determining the vehicle identification tag for the determined target group of mobile vehicles; and
means for sending the determined vehicle identification tag and the targeted message from the call center to a satellite radio broadcaster for transmitting the satellite broadcast message to the mobile vehicle.

10. The system of claim 9 further comprising:
means for filtering at least one customer data record at the call center to determine the target group of mobile vehicles.

11. A computer usable medium including a program to send a targeted message to a mobile vehicle, the program comprising:
computer program code to receive a satellite broadcast message at the mobile vehicle, the satellite broadcast message including a vehicle identification tag, a play-delay indicator associated with a delay time expressed as a predetermined number of ignition cycles of the mobile vehicle, and the targeted message;
computer program code to determine whether the vehicle identification tag associated with the satellite broadcast message matches a vehicle identification tag associated with mobile vehicle; and
computer program code to, if the vehicle identification tag matches a vehicle identification tag associated with the mobile vehicle, store the targeted message at the mobile vehicle responsive to the play-delay indicator and playing the targeted message using one of an audio output device and a visual output device after expiration of the predetermined number of ignition cycles associated with the play-delay indicator.

12. The computer usable medium of claim 11 further comprising:
computer program code to determine a target group of mobile vehicles at a call center;
computer program code to determine the vehicle identification tag for the determined target group of mobile vehicles; and
computer program code to send the determined vehicle identification tag and the targeted message from the call center to a satellite radio broadcaster for transmitting the satellite broadcast message to the mobile vehicle.

13. The computer usable medium of claim 12 further comprising:
computer program code to filter at least one customer data record at the call center to determine the target group of mobile vehicles.

* * * * *